March 17, 1964　　W. W. R. SEARLE　　3,125,695
MECHANICAL STEPPING TIMER
Filed Dec. 23, 1960　　3 Sheets-Sheet 1
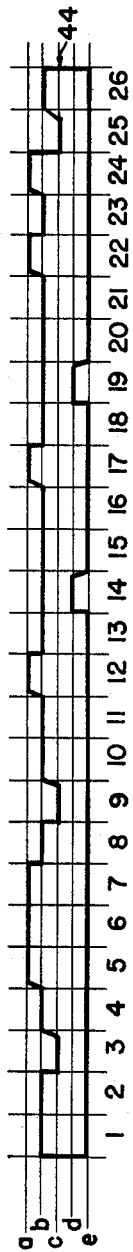
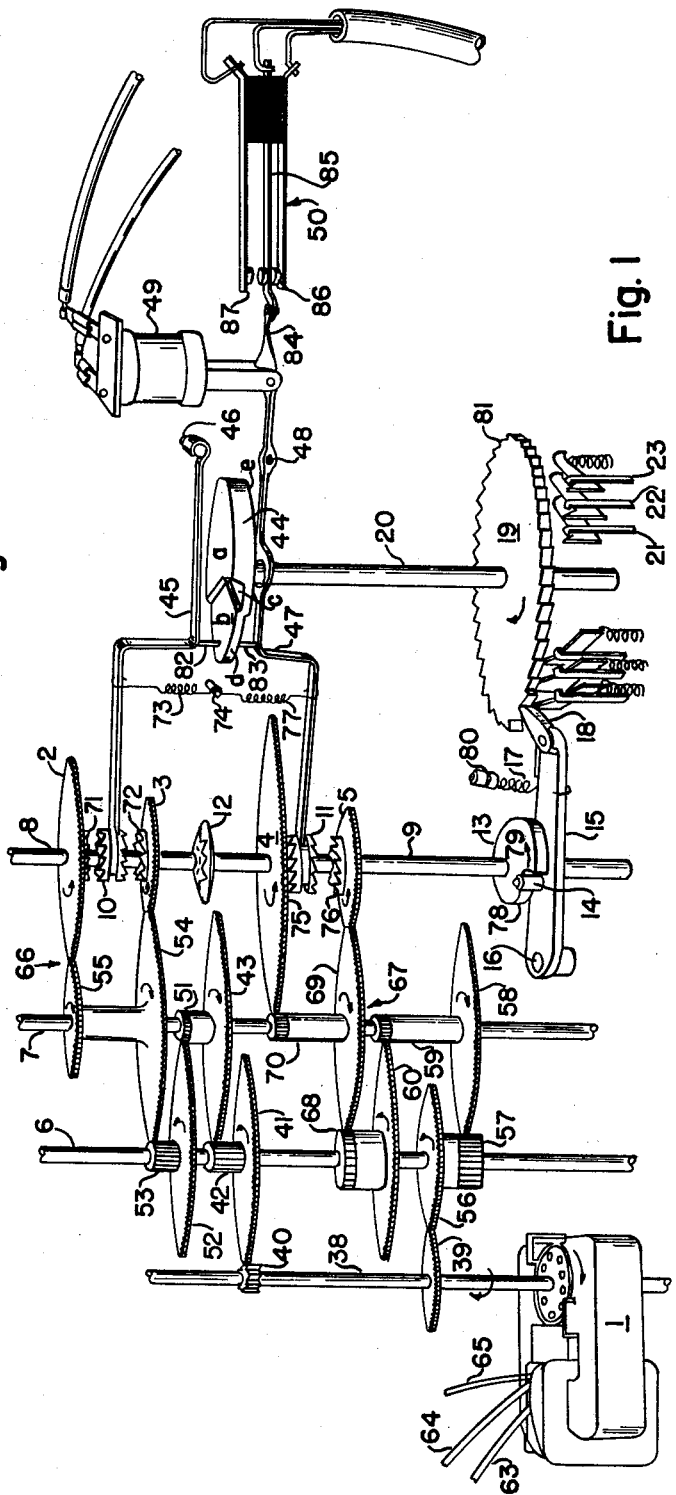

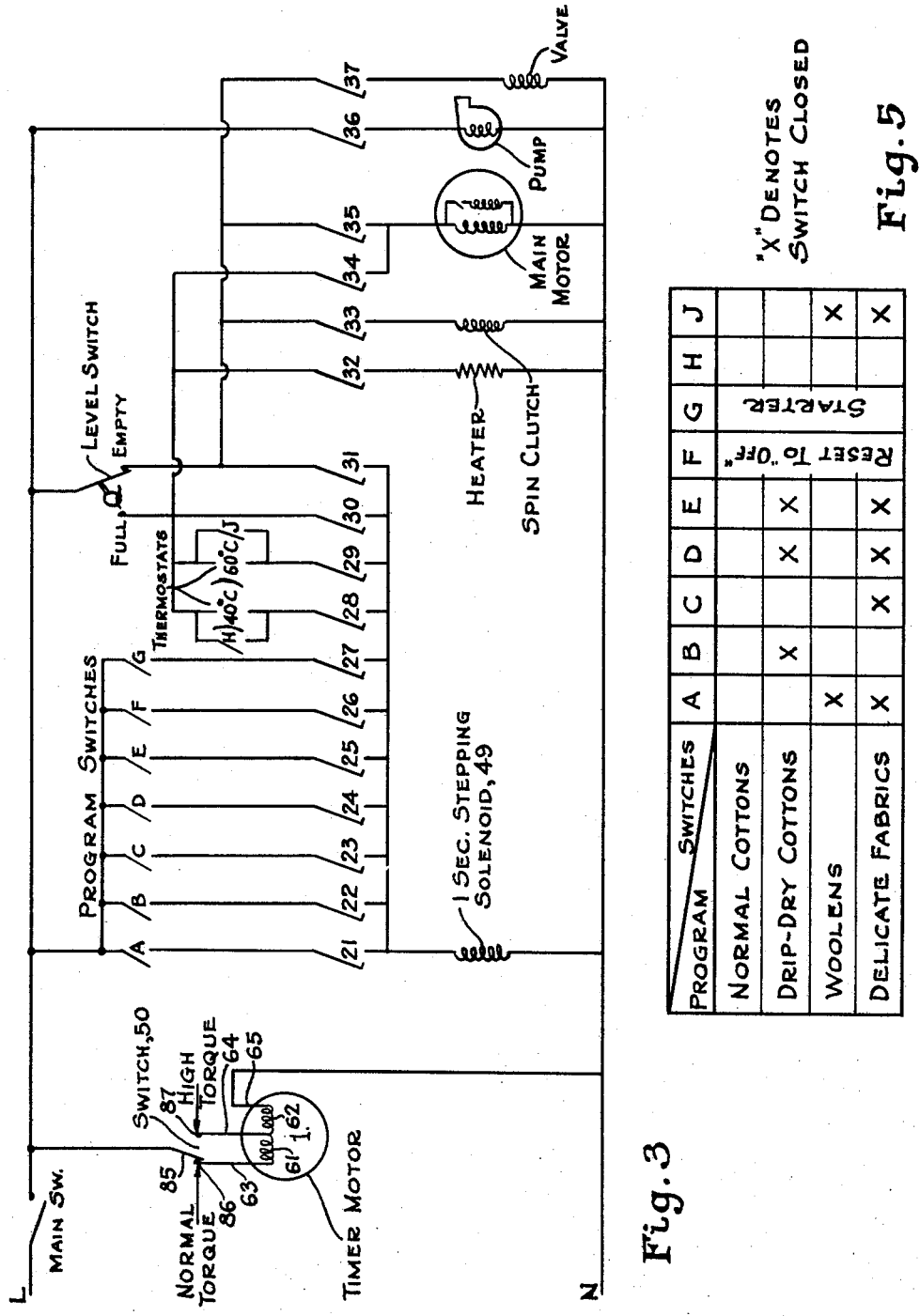

Fig. 4

| Operation | Duration of Step, if Timed | Cause of Step if Un-Timed | 21 Skip 4 Min. of Wash | 22 Skip 2 Min. of Wash | 23 Skip 2nd. Rinse | 24 Skip Rinse Heat | 25 Skip 2 Min. of Spin | 26 Reset to "Off" | 27 Starter | 28 40°C Step | 29 60°C Step | 30 Full Step | 31 Empty Step | 32 Heater | 33 Spin Clutch | 34 Motor (Full Level) | 35 Motor (Empty Level) | 36 Pump | 37 Water Valve |
|---|---|---|---|---|---|---|---|---|---|---|---|---|---|---|---|---|---|---|---|
| 1 Fill |  | F, Level Sw. |  |  |  |  |  |  |  |  |  | H |  |  |  | H |  |  | H |
| 2 Heat to 40°C | 40 Sec. | 40°Th. or E. |  |  |  |  |  |  |  | H |  |  | H | H |  | H |  |  |  |
| 3 Wash |  | 60°Th. |  |  |  |  |  |  |  |  | H |  | H |  |  |  |  |  |  |
| 4 Heat to 60°C |  | 60°Th. or E. |  |  |  |  |  |  |  |  |  |  | H | H |  | H |  |  |  |
| 5 Wash | 2 Min. |  |  |  |  |  |  |  |  |  |  |  | H |  |  |  |  |  |  |
| 6 Wash | 2 Min. |  |  |  |  |  |  |  |  |  |  |  | H |  |  |  |  |  |  |
| 7 Wash | 2 Min. |  | H |  |  |  |  |  |  |  |  |  |  |  |  |  |  |  |  |
| 8 Pump |  | E, Level Sw. |  | H |  |  |  |  |  |  |  |  |  |  |  |  |  | H |  |
| 9 Pump | 40 Sec. |  |  |  |  |  |  | H |  |  |  |  |  |  |  |  |  | H |  |
| 10 Fill |  | F, Level Sw. |  |  |  |  |  |  |  |  |  | H |  |  |  | H |  |  | H |
| 11 Heat to 40°C |  | 40°Th. or E. |  |  |  | H |  |  |  | H |  |  | H | H |  | H |  |  |  |
| 12 Rinse | 2 Min. |  |  |  |  |  |  |  |  |  |  |  | H |  |  |  |  |  |  |
| 13 Pump |  | E, Level Sw. |  |  |  |  |  | H |  |  |  |  |  |  |  |  |  | H |  |
| 14 Spin | 20 Sec. |  |  |  |  |  |  |  |  |  |  |  | H |  | H |  | H | H |  |
| 15 Fill |  | F, Level Sw. |  |  |  |  |  |  |  |  |  | H |  |  |  | H |  |  | H |
| 16 Heat to 40°C |  | 40°Th. or E. |  |  |  | H |  |  |  | H |  |  | H | H |  | H |  |  |  |
| 17 Rinse | 2 Min. |  |  |  | H |  |  |  |  |  |  |  | H |  |  |  |  |  |  |
| 18 Pump |  | E, Level Sw. |  |  |  |  |  | H |  |  |  |  |  |  |  |  |  | H |  |
| 19 Spin | 20 Sec. |  |  |  |  |  |  |  |  |  |  |  | H |  | H |  | H | H |  |
| 20 Fill |  | F, Level Sw. |  |  |  |  |  |  |  |  |  | H |  |  |  | H |  |  | H |
| 21 Heat to 40°C |  | 40°Th. or E. |  |  |  | H |  |  |  | H |  |  | H | H |  | H |  |  |  |
| 22 Rinse | 2 Min. |  |  |  |  |  |  |  |  |  |  |  | H |  |  |  |  |  |  |
| 23 Pump |  | E, Level Sw. |  |  |  |  |  | H |  |  |  |  |  |  |  |  |  | H |  |
| 24 Spin | 2 Min. |  |  |  |  |  |  | H |  |  |  |  | H |  | H |  | H | H |  |
| 25 Spin | 40 Sec. |  |  |  |  |  | H | H |  |  |  |  | H |  | H |  | H | H |  |
| 26 Off |  |  |  |  |  |  |  |  | H |  |  |  |  |  |  |  |  |  |  |

Switch Functions — Switch Number

# United States Patent Office 3,125,695
Patented Mar. 17, 1964

3,125,695
MECHANICAL STEPPING TIMER
Walter W. R. Searle, Ickenham, England, assignor to The Hoover Company, North Canton, Ohio, a corporation of Ohio
Filed Dec. 23, 1960, Ser. No. 78,112
Claims priority, application Great Britain Jan. 19, 1960
16 Claims. (Cl. 307—141.8)

The present invention relates to a timer and more particularly to a timer for a domestic washing machine.

The timer of the present invention is a program timer having a master cam which actuates switches for controlling each of the operations which a particular washing machine is capable of performing and in a proper sequence for properly washing different types of fabrics, and in which, for different types of fabrics, the cam is stepped past operations which are not necessary for the particular fabric being washed. The particular number and sequence of operations to be performed may be preselected before the washing operation is begun.

According to the timer of the present invention the master cam is stepped one step each time the timer gives an impulse and may also be stepped forward, for example, by level or thermally responsive switches.

Timers as above described are generally known in the art. The timer of the present invention differs from those known in the art in the provision of a motor driving a mechanical change speed gearing arrangement having at least three ratios whereby the interval between one step of the master cam and the next may have at least three different durations and means for selecting the ratio and thus determining the duration of the intervals.

The gear change mechanism includes a high speed ratio resulting in a negligibly short interval so that the operation at that point is virtually omitted from a program.

Specifically, according to the present invention, a timer is provided including a set of program cams arranged to actuate program switches controlling the various operations of a washing machine with means for advancing the program cams step by step by means of a timer motor and a mechanical change speed gearing having at least three ratios so that the interval between any one step and the next may have any of three different durations and in which the time duration of any particular step is determined by the position of the program cams.

Further, according to the present invention, one of the speed ratios is of such small duration as to virtually omit or skip the operation taking place at that time.

According to the present invention the operation which is virtually omitted or skipped may be preselected by the operation of a manual switch.

According to the present invention the speed ratio of small duration is actuated by a solenoid under the control of a manually actuated switch and a circuit determined by the position of the program cams.

Other objects and advantages of the present invention will become apparent as the description proceeds when taken in connection with the accompanying drawings in which:

FIG. 1 is an exploded schematic view of the timer of the present invention,

FIG. 2 is a developed view of the time setting cams of FIG. 1,

FIG. 3 is a typical circuit diagram for a washing program which the timer of FIG. 1 may control, FIG. 4 is a sequence chart showing the position of the various switches of FIG. 3 during a typical washing program, and FIG. 5 is a chart showing how various switches may be set for varying the program for washing different types of fabrics.

FIG. 1 is an exploded schematic view of the timer of the present invention and, in actual use, the mechanism there shown is housed within a small casing no larger than a small clock so that it may be attached to the casing of a washing machine at any convenient point.

A timer motor 1, through suitable gear trains as shown, drives the gear wheels 2, 3, 4 and 5 at different speeds, for example, the wheel 2 may be rotated one revolution in 120 second, the wheel 3 one revolution in 40 seconds, the wheel 4 one revolution in 20 seconds and the wheel 5 one revolution in 1 second. Different speed ratios may be used for the wheels 2, 3 and 4 for setting up different washing programs but the wheel 5, which is the stepping wheel, should be operated at high speed and it has been found that one revolution per second is suitable.

The timer motor 1 is of the shaded pole type having a pair of torque windings 61 and 62 (FIG. 3) with external connections 63, 64 and 65. The windings 61 and 62 are controlled by a switch 50 to place one or both windings in circuit to vary the torque produced by the motor 1, for a purpose which will be explained hereinafter.

The shaft 38 of motor 1 rotates in a clockwise direction as shown by the arrow (FIG. 1) and carries gears 39 and 40 fixed to the shaft 38.

The shafts 6 and 7 are non-rotatably fixed to the casing in which the mechanism of FIG. 1 is housed. The shafts 6 and 7 carry two trains 66 and 67 of gearing meshed at one end with the gears 40 and 39 respectively and at the opposite end with the time selecting gears 2 to 5 inclusive. The gears of the two trains are freely rotatable on shafts 6 and 7 but are fixed against movement along those shafts.

The upper gear train 66 includes gears 41 and 42 fixed to each other, the gear 41 meshing with gear 40 so as to rotate the gears 41 and 42 counterclockwise on shaft 6; the gears 43 and 51 fixed to each other, the gear 43 meshing with gear 42 so that the gears 43 and 51 rotate clockwise on shaft 7; the gears 52 and 53, fixed to each other, the gear 52 meshing with the gear 51 so as to rotate the gears 52 and 53 counterclockwise on shaft 6; and the gears 54 and 55 fixed to each other, the gear 54 meshing with gear 53 so as to rotate gears 54 and 55 clockwise on shaft 7. The gear 55 is meshed with the time selecting gear 2 so as to rotate it counterclockwise on shaft 8, and the gear 54 meshes with time selecting gear 3 to also rotate it counterclockwise on shaft 8, the time selecting gears being fixed against movement longitudinally of the shaft 8.

The gearing is such that the time selecting gear 2 is rotated one revolution in 120 seconds and the time selecting gear 3 is rotated one revolution in 40 seconds.

The lower gear train 67 includes the gears 56 and 57, fixed to each other, the gear 56 meshing with gear 39 so as to rotate the gears 56 and 57 counterclockwise on shaft 6; the gears 58 and 59, fixed to each other, the gear 58 meshing with gear 57 so as to rotate gears 58 and 59 clockwise on shaft 7; the gears 60 and 68, fixed to each other, the gear 60 meshing with gear 59 so as to rotate gears 60 and 68 counterclockwise on shaft 6; and the gears 69 and 70, fixed to each other, the gear 69 meshing with the gear 68 so as to rotate gears 69 and 70 clockwise on shaft 7.

The gear 69 meshes with the time selecting gear 5 so as to rotate it counterclockwise on shaft 9 and the gear 70 meshes with the time selecting gear 4 so as to also rotate it counterclockwise on shaft 9, the gears 4 and 5 being fixed against longitudinal movement along shaft 9. The gearing is such that the time selecting gear 4 is rotated one revolution in 20 seconds and the time selecting gear 5 is rotated one revolution in one second.

The shafts 8 and 9 are each mounted for rotation in the casing in which the mechanism is housed and shaft 8 is connected to shaft 9 by a slip or overrunning clutch 12 so that the shaft 9 can be rotated faster than shaft 8.

A double faced clutch member 10 is splined to shaft 8 and cooperates with clutch member 71 fixed to the bottom of time selecting gear 2 and with clutch member 72 fixed to the upper face of time selecting gear 3.

As shown the clutch member 10 is in its central position out of engagement with clutch members 71 and 72. It is adapted to be moved into engagement with members 71 and 72 by the forked end of layer 45 pivoted to the housing at 46 and biased downwardly by a spring 73 having its lower end anchored to the casing by a pin 74.

A double faced clutch member 11 is splined to the shaft 9 and cooperates with clutch members 75 and 76 fixed to the lower and upper faces of time selecting gears 4 and 5 respectively.

The clutch member 11 is shown in engagement with clutch member 75 and is adapted to be moved downwardly into engagement with clutch member 76 or to an intermediate non-engaged position by the forked end of a lever 47 pivoted to the casing at 48. The lever 47 is biased upwardly by a spring 77 anchored to the pin 74.

During operation the motor 1 is continuously operated so that the time selecting gears 2–5 inclusive are continuously being rotated counterclockwise. Movement of the clutch member 10 upwardly into engagement with clutch member 71 will rotate the shaft 8, and through clutch 12, the shaft 9, at a comparatively slow speed of one revolution in 2 minutes. Movement of the clutch member 10 downwardly into engagement with the clutch member 72 will rotate the shafts 8 and 9 at a faster speed of one revolution in 40 seconds. In the position shown, the shaft 8 is stationary.

When the clutch member 11 is in the position shown, the shaft 9 will be rotated counterclockwise at one revolution in 20 seconds and that is true even though clutch member 10 should happen to be in engagement with the slower speed gears 2 or 3 because of the clutch 12. When the clutch member 11 is moved to its lower position into engagement with the clutch member 76 the shaft 9 will be rotated at the high speed of one revolution per second regardless of the position of clutch member 10. The clutch member 11 may also be moved to an intermediate position and the shaft 9 will remain stationary unless the clutch member 10 is in engagement with one or the other of its cooperating clutch members, 71 or 72.

A spiral cam 13 is fixed to shaft 9 to rotate therewith in a counterclockwise direction. The cam 13 has a gradually rising surface 78 with a sudden drop off at 79. The cam 13 cooperates with a cam follower 14 mounted on a lever 15 pivoted to the casing at 16. The lever 15 is biased to hold the follower 14 against the cam surface 78 by means of a spring 17 anchored to the casing at 80.

The outer end of lever 15 carries a spring pawl 18 which cooperates with ratchet teeth 81 on a stepping program cam 19 fixed to a shaft 20 rotatably mounted in the casing. If necessary, a pawl may be provided to prevent reverse rotation of the cam 19.

As the cam 13 is rotated the follower 14 rides over the surface 78 and gradually moves the lever 15 outwardly to move the pawl 18 over the slanting surface of one of the teeth 81, with which it is then in engagement, until it snaps over the edge of the tooth. By that time the follower 14 will have reached the drop-off 79 and the spring 17 will suddenly pull the lever 15 back into the position shown and the pawl 18 will engage the edge of a tooth 81 and step the program cam 19 one step clockwise.

As will appear, there are as many teeth 81 on the program cam 19 as there are operations to be performed in the master washing program for which the timer is designed. The number of teeth 81 shown in FIG. 1 is merely exemplary and does not correspond to the master program of FIGS. 3 and 4.

Fixed to the shaft 20 is a time selector cam 44. The upper face of cam 44 is provided with three cam surfaces $a$, $b$ and $c$ at different levels and its lower face is provided with two cam surfaces $d$ and $e$ also at different levels. As the cam 44 is rotated, cam follower 82, mounted on lever 45, rides over surfaces $a$, $b$ and $c$ being held in engagement therewith by the spring 73 and the cam follower 83, mounted on lever 47 rides over surfaces $d$ and $e$ being held in engagement therewith by spring 77.

In the position shown in FIG. 1, the follower 82 is in contact with surface $b$, the clutch member 10 is in its mid-position and disengaged from both time selecting gears 2 and 3. When the follower 82 rides on surface $a$ the lever 45 will be pivoted upwardly to engage clutch member 10 with clutch member 71 and the shafts 8 and 9 will be rotated at slow speed. When the follower 82 rides on the surface $c$ the clutch member 10 will be pulled downwardly into engagement with clutch member 72 by spring 73 and the shafts 8 and 9 will be driven at a faster speed of one revolution in 40 seconds.

In the position shown in FIG. 1 the follower 83 is in contact with the surface $d$ and the spring 77 will hold the clutch member 10 in engagement with the clutch member 75 and the shaft 9 will be rotated at a still faster speed of one revolution in 20 seconds. When the follower 83 rides on the surface $e$ the lever 47 is pivoted downwardly to move the clutch member 11 downwardly into a mid-position where it is not in engagement with either of the clutch members 75 or 76 and the shaft 9 will be stationary unless being driven by shaft 8 through clutch 12.

It is to be noted that the "neutral" position of the timer is when the follower 82 is in contact with surface $b$ and follower 83 is in contact with surface $e$ and both clutches 10 and 11 are in their mid-positions and thus none of the time selecting gears 2–5 inclusive is operative to rotate the stepper cam 13.

The timer takes its "neutral" position in the "off" position of the machine and during those operations which are not timed such as filling, emptying and heating which may be terminated by level and thermostatic switches.

The lever 47 is pivoted to the plunger of solenoid 49 adapted to be energized by some of the switches which are actuated by stepping cam 19 and by level and temperature responsive switches as will appear later. When the solenoid 49 is energized its plunger is pulled upwardly which pivots the lever 47 about its pivot 48 and moves the clutch member 11 downwardly into engagement with the clutch member 76 so that shaft 9 is rotated at very high speed and operates cam 13 to step the program cam 19 forward one notch, almost instantly (1 second).

The lever 47 is extended at 84 and is connected to a switch arm 85 of switch 50 which normally closes the normal torque contact 86 and is moved upwardly when the solenoid 49 is energized, to close high torque contact 87. The purpose of that arrangement is to give the motor 1 high torque when it is rotating the shaft 9 at high speed.

The time controlling cam 44 of FIG. 1 merely illustrates the principle upon which it operates in providing the five levels $a$ to $e$ inclusive on its faces for controlling the position of the clutches as explained above. In actual use in designing a timer for controlling a particular master program for a washing machine a plurality of areas on the upper surface of the cam 44 must be at each of the levels $a$, $b$ and $c$ and a plurality of areas on its lower surface must be at each of the levels $d$ and $e$.

A different arrangement is necessary for each master program desired and FIG. 2 is a developed view of the cam surface arrangement of cam 44 for the master program of the sequence chart of FIG. 4. The numbers beneath the cam 44 of FIG. 2 are the operation numbers appearing at the left of the sequence chart of FIG. 4.

Thus operation 1 is a fill operation terminated by level switch F so that no timing is necessary. The followers 82 and 83 should therefore be at levels *b* and *e* where both clutches 10 and 11 are at their mid position so that the timer is in its "neutral" position.

Similarly at stations 2, 4, 8, 10, 11, 13, 15, 16, 18, 20, 21 and 23, a non-timed function is being performed and the timer should be in its "neutral" position with the followers 82 and 83 positioned at levels *b* and *e* respectively.

At stations 3, 9 and 25 a forty second timed interval is called for. At corresponding positions on the upper surface of the time selector cam 44 will be areas at the level *c* and the follower 82 will move to that level to permit the clutch member 10 to move into engagement with the clutch member 72 so that the shafts 8 and 9 and cam 13 will be driven by the time selector gear 3 at a speed of one revolution in 40 seconds. The lower face of cam 40 will have surfaces at level *e* at each of the above positions so that cam 11 will remain at its mid-position.

At stations 5, 6, 7, 12, 17, 22 and 24, two minute timed intervals are called for. At corresponding positions on the upper surface of time selector cam 44 will be areas at the level *a* and cam follower 82 will move upwardly to pivot lever 45 upwardly and engage clutch member 10 with clutch member 71 so that shafts 8 and 9 and cam 13 will be rotated by the time selecting gear 2 at a speed of one revolution in 2 minutes. As before, the lower surface of cam 44 will be at level *e* and the clutch member 11 will remain in its mid-position.

At stations 14 and 19 twenty second timed intervals are called for. At corresponding positions on cam 44 its lower surface will be at level *d* and the cam follower 83 will permit the lever 47 to pivot upwardly and engage the clutch member 11 with the clutch member 74 so that the shaft 9 and cam 13 will be rotated by the time selecting gear 4 at a speed of one revolution in 20 seconds. Because shaft 9 can be rotated at a faster speed than shaft 8, by slippage of clutch 12, the follower 82 may be at any level at those stations but it is preferably at level *b* so that the clutch member 10 will be at its mid-position.

The time selector cam 44 need not be separately formed as shown but may be formed on the upper surface of cam 19. For example, two concentric annular grooves could be formed in the upper surface of cam 19 with the cam followers 82 and 83 riding in the grooves. The bottoms of the grooves would then be formed at the levels *a* to *e* inclusive as in FIG. 2, to provide for the master program of the sequence chart of FIG. 4. The action of the lever 47 and clutch member 11 would, of course, have to be reversed with such an arrangement.

The lower surface of the cam 19 is formed with a plurality of concentric annular cam tracks which are operative to close normally open switches 21 to 37 inclusive as the cam 19 is stepped about. For the master program of the sequence chart of FIG. 4 the black spaces of that chart represent a devlopment of the cam tracks on the bottom face of cam 19 and indicate when the various switches are closed.

The switches 21 to 37 inclusive are normally open switches and are properly positioned relative to the cams on the lower face of cam 19 so as to be closed to operate the various functional devices of a combined washer and spin extractor at the proper times to carry out the desired master program, for example that of the sequence chart of FIG. 4.

By reference to the wiring diagram of FIG. 3, the sequence chart of FIG. 4, and the development of the cam 44 of FIG. 2 in connection with the timer of FIG. 1, the operation of the timer of the present invention may be explained.

The letter L (FIG. 3) represents the positive wire of an electrical source while the letter N represents the ground wire. To start the timer motor 1 the main switch is closed and the time selecting gears 2 to 5 inclusive are continuously rotated at their previously mentioned preselected respective speeds during the entire time the machine is in operation.

Station 26 is the "off" position, cam followers 82 and 83 are at levels *b* and *e* of cam 44 and the timer is in its "neutral" position with the cam 13 stationary and the switch 27 is closed.

The switch G, a normally open push button switch, is momentarily closed. That will energize solenoid 49 and move the clutch member 11 into engagement with the clutch member 76 and the cam 13 will be rotated one revolution in one second to immediately step the cam 19 to station 1.

Station 1 is a fill position, not subject to a timed duration, and the timer is in "neutral" position by reason of the cam followers 82 and 83 being at levels *b* and *e* on cam 44 as previously explained. The level switch is of the snap acting type and has an "empty" position and a "full" position. At position station 1 the switch 37 is closed to open the fill valve and admit water to the tub. When the tub is full the level switch snaps from its "empty" position its "full" position to close the fill valve. Since the switch 30 is closed at station 1, when the level switch moves to its "full" position the solenoid 49 will be energized to step the cam 19 to station 2 in a previously explained manner.

Station 2 is a heating operation under the control of the 40° thermostat and the timer remains in its "neutral" position. The switch 32 is closed and the heater is energized through the "full" position of the level switch. When the water temperature reaches 40° the 40° thermostatic switch closes and through closed switch 28 energizes the solenoid 49 to step the cam 19 to station 3.

Station 3 calls for a 40 second wash period and accordingly the cam follower 82 is at level *c* of cam 44, the clutch member 10 will be in engagement with clutch member 72 and the cam 13 will be driven by the 40 second time selector gear 3. The main motor is energized by closed switch 34 and the level switch at its "full" position. Normally, the cam 19 would be stepped to station 4 by the timer, in a previously explained manner, at the end of 40 seconds. However, if the temperature of the incoming water is 60° or over, the 60° thermostat would close and through the closed switch 29 energize the solenoid 49 to step the cam 19 to station 4.

Station 4 is a heating operation under the control of 60° thermostat and if the incoming water was 60° or over, the solenoid will remain energized and the cam 19 will be stepped immediately to station 5. Normally, however, the heater is energized by closed switch 32 and the "full" position of the level switch and when the water temperature reaches 60° the 60° thermostat will operate through closed switch 29 to step cam 19 to station 5. At station 4 the timer is in "neutral" position since the cam follower 82 has returned to level *b* of cam 44.

Station 5 calls for a 2 minute washing period and the main motor is energized by closed switch 34 and the level switch at its "full" position. The follower 82 has moved to level *a* of cam 44 and the clutch member 10 has moved into engagement with clutch member 71 so that the cam 13 is driven by the 2 minute time selector gear 2. The machine will operate for 2 minutes and the cam 19 will be stepped to station 6.

Stations 6 and 7 also call for 2 minute wash periods and the timer will continue without change for the next 4 minutes except for stepping the cam 19 from station 6 to station 7 and from station 7 to station 8 in a manner previously explained.

Station 8 is an emptying operation under the control of the level switch and, accordingly, the timer is moved to its "neutral" position as explained. The pump is energized by closed switch 36. When the tub is empty the level switch will move to its "empty" position and through closed switch 31 will energize the solenoid 49 to step the cam 19 to station 9.

On account of suds formation in the tub it is sometimes necessary to continue the operation of the exhaust pump for a short period after the level switch indicates "empty." Station 9 provides for that contingency and calls for a 40 second period of additional pumping, in which the switch 36 remains closed to continue operation of the pump. The cam follower moves to level $c$ of cam 44 and the cam 13 is rotated by the 40 second time selector gear 3. At the end of 40 seconds the cam 19 is stepped to station 10.

Station 10 is a fill operation under the control of the level switch and the timer is in its "neutral" position as indicated by FIG. 2. The inlet valve is opened by closed switch 37 and the "empty" position of the level switch. When the tub is full the level switch snaps to its "full" position to close the fill valve and energize the solenoid 49 via closed switch 30, to step the cam 19 to station 11.

Station 11 is a heating period under control of the 40° thermostat, the timer remains in its "neutral" position and the heater is energized by closed switch 32.

When the water temperature reaches 40° the 40° thermostat closes and through closed switch 28 energizes solenoid 49 to step the cam 19 to station 12.

Station 12 calls for a 2 minute rinse period and the main motor is energized by closed switch 34 and the level switch at its "full" position. The cam follower 82 is at level $a$ of cam 44 and the 2 minute time selector gear 2 rotates the cam 13. At the end of two minutes the cam 19 is stepped to station 13.

Station 13 is an empty station under the control of the level switch, the timer is in its "neutral" position, and the pump is energized by closed switch 36. When the tub is empty the level switch moves to its "empty" position and through closed switch 31 energizes the solenoid 49 and steps the cam 19 to station 14.

Station 14 calls for a 20 second spin extraction operation, the cam follower 83 moves up to level $d$ on the lower face of cam 44 and engages the clutch member 11 with the clutch member 75 so that the cam 13 is rotated by the 20 second time selecting gear 4. The main motor is energized by the closed switch 35 and the "empty" position of the level switch. The high speed spin clutch is energized by the "empty" position of the level switch and the closed switch 33 and the pump remains energized by closed switch 36. At the end of 20 seconds the cam 19 is stepped to station 15.

Station 15 is a fill station under the control of the level switch and the timer is in its neutral position. The fill valve is opened by closed switch 37 and the "empty" position of the level switch. When the tub is full the level switch moves to its "full" position to close the fill valve and through closed switch 30 to energize the solenoid 49 and step cam 19 to station 16.

Station 16 is a heating operation under the control of the 40° thermostat and the timer is "neutral." The heater is energized by closed switch 32 and the level switch at its "full" position. When the water temperature reaches 40°, the 40° thermostat closes and through closed switch 28 energizes the solenoid 49 to step cam 19 to station 17.

Station 17 calls for a 2 minute rinse period, the cam follower 82 is at level $a$ of cam 44 so that the cam 13 is driven by the 2 minute time selector gear 2, and the main motor is energized by closed switch 34 and the "full" position of the level switch. At the end of 2 minutes the timer steps the cam 19 to station 18.

Station 18 is an emptying step under the control of the level switch and the timer is "neutral." The pump is energized by closed switch 36. When the tub is empty the level switch snaps to its "empty" position and through closed switch 31 energizes the solenoid 49 to step cam 19 to station 19.

Station 19 calls for a 20 second spin extraction operation, the cam follower 83 is at level $d$ on the lower face of cam 44 so that cam 13 is rotated by the 20 second time selector gear 4, the main motor is energized by closed switch 35 and the "empty" position of the level switch and the pump remains energized by closed switch 36. At the end of 20 seconds the timer steps the cam 19 to station 20.

Station 20 is a fill operation under the control of the level switch and the timer returns to "neutral." The fill valve is opened by closed switch 37 and the "empty" position of the level switch. When the tub is full the level switch snaps to its "full" position, which closes the fill valve and through closed switch 30 energizes the solenoid 49 to step the cam 19 to station 21.

Station 21 is a heating period under the control of the 40° thermostat, the timer remains "neutral" and the heater is energized by closed switch 32 and the "full" position of the level switch. When the water temperature reaches 40° the 40° thermostat closes and through closed switch 28 energizes the solenoid 49 to step the cam 19 to station 22.

Station 22 calls for a two minute rinse operation, the 2 minute time selector gear 2 is connected to drive cam 13 and the main motor is energized by closed switch 34 and the "full" position of the level switch. At the end of 2 minutes the timer steps the cam 19 to station 23.

Station 23 is an emptying operation under the control of the level switch, the timer is "neutral" and the pump is energized by closed switch 36. When the tub is empty the level switch snaps to its "empty" position and through closed switch 31 energizes solenoid 49 to step cam 19 to station 24.

Station 24 calls for a 2 minute spin period, the follower 82 acts to connect the 2 minute time selecting gear 2 in driving relation with cam 13, the main motor is energized by closed switch 35 and the "empty" position of the level switch and the spin clutch is energized by closed switch 33 and the "empty" position of the level switch. At the end of 2 minutes the timer steps cam 19 to station 25.

Station 25 calls for a 40 second spin extraction operation. The circuits remain the same as for station 24 but the cam follower 83 will move to the level $c$ of cam 44 to connect the 40 second time selector gear 3 in driving relationship with the cam 13. At the end of 40 seconds the timer will move cam 19 to station 26 which is the "off" position.

The switches A, B, C, D, E, H and J are normally open manually actuatable switches which may be closed prior to the start of a washing operation to preselect a number of operations which may be omitted from the master program above described and designated by the 26 stations of FIG. 4.

By reference to FIG. 5 it will be seen that the master program of 26 stations, shown in FIG. 4, is designed to wash normal cottons.

By manually closing switches B, D and E the program is modified so as to be proper for drip-dry cottons. The switches B, D and E are series connected with switches 22, 24 and 25 respectively which are closed by the cams on the bottom of stepper cam 19.

By referring to the sequence chart of FIG. 4 it will be seen that switch 21 is closed at station 7, switch 24 is closed at stations 11, 16 and 21 and switch 25 is closed at station 24.

When station 7 is reached, the switches B and 22 being closed, the solenoid 49 is energized and the cam 19 immediately advanced to station 8 and the last one of the 2 minute washing operations is omitted.

When station 11 is reached, the switches D and 24 being closed, the solenoid 49 immediately steps cam 19 to station 12 and the 40° heating period is skipped.

The same is true at stations 16 and 21 so that there is no heating during rinsing operations.

At station 24, switches E and 25 being closed, the 2 minute spin extracting operation is skipped and the spin extraction is limited to 40 seconds which takes place at station 25.

For washing woolens, switches A and J are manually closed before the start of the washing operation. Switches 21 and 29 are series connected with switches A and J respectively.

Switch 21 is closed at stations 5 and 6 so that two 2 minute washing periods are skipped.

Switch 29 is closed at stations 3 and 4 which results in the 40 second prewashing operation of station 3 and the heating operation of station 4 being skipped.

For washing delicate fabrics such as silks, nylons, etc., switches A, C, D, C and J are closed prior to the washing operation. Switches 21, 23, 24, 25 and 29 are series connected with switches A, C, D, E and J respectively.

Switch 21 closed at stations 5 and 6, switch 23 at stations 15 to 19 inclusive, switch 24 at stations 11, 16 and 21, switch 25 at station 24 and switch 29 at stations 3 and 4.

Thus, for delicate fabrics, the 40 second prewash of station 3, the 60° heating of station 4, the two 2 minute washing operations of stations 5 and 6, the 40° heating operations of stations 11, 16 and 21, the rinse and spin operations at stations 15 to 19 inclusive and the 2 minute spin operation of station 24 are all skipped.

By closing switch H series connected with switch 28 all of the 40° heating operations, stations 2, 11, 16 and 21 will be skipped. That would be useful when the hot water supply is already at 40°

By closing both switches H and J no heating at all will take place.

It may sometimes happen that it is desirable to turn the machine off immediately once a washing operation has begun without performing any of the remaining operations.

The switch F is provided for that purpose and may take the form of a normally open push button switch adapted to be held closed temporarily while the machine is stepped through its remaining operations. The switch F is series connected with switch 26 and from the chart of FIG. 4 it is to be noted that switch 26 is closed at all stations except the emptying stations 13, 18, and 23.

Assuming an extreme condition in which the machine is charged with clothes and started and it is discovered that the water supply has failed, the level switch will not step the cam 19 at station 2 and the mal-function would soon be discovered.

The operator would then close switch F and repeatedly energize the solenoid 49 through closed switch 26 and step the cam 19 continuously until the station 13 is reached where switch 26 is open.

However, under the assumption made, the tub is empty and the solenoid will be immediately energized through the "empty" position of the level switch and closed switch 31 to step the cam 19 immediately to station 14. The cam 19 will then continue to be stepped through the remaining stations in the same manner until the "off" station 26 is reached. After the mal-function is corrected the machine may be restarted.

The switch 26 is left open at each of the emptying stations 13, 18 and 23 to assure that the tub will be emptied should the switch F be closed with the tub full. In such a case in which the cam reaches any one of stations 13, 18 or 23 with the tub full, the pump will be energized by closed switch 36 until the level switch snaps to its "empty" position to energize the solenoid 49 through closed switch 31 to step cam 19 to the next station. The machine will then continue to step through the remaining stations as previously described.

It can thus be seen that the maximum time the operator will have to hold the switch F closed will be 25 seconds or less plus the time it takes to empty the tub which is only a few seconds at most.

It will be noted from the sequence chart of FIG. 4 that, at each of the heating stations 2, 4, 11, 16 and 21, the heating operation may be terminated by a thermostat or immediately stepped to the next station by the "empty" position of the level switch through closed switch 31. That is to take care of a situation in which, by some mal-function, the tub is empty when the machine is stepped to a heating station. Obviously, under such conditions, the clothes in the tub might be damaged or some other damage occur.

The mal-function may be caused by a thermostat failure and a consequent boiling off of the water, the inadvertent depression of switch F to step through station 1, or perhaps a leak.

From the foregoing it can be seen that the present invention provides a mechanical change speed timer for a washer by which any of the operations performed may have any one of two or more time durations and which may be preset to skip various operations of a master program to provide different washing programs for different types of fabrics. The time duration of any operation may be varied first by driving a timing cam at any one of three different speeds, by providing for a plurality of succeeding operations of the same kind and of the same time duration or by providing a plurality of succeeding operations of the same kind and of different time durations.

For example, the prewashing operation of station 3 could be changed to 20 seconds or to 2 minutes by altering the configuration of the cam 44 so that time selector gear 4 or time selector gear 2 drives the timing cam 13. Similarly, any other of the timed operations could be changed by altering the cam 44 at those stations or by changing the number of succeeding operations of the same kind either of the same or different time duration.

While I have shown and described but a single embodiment of my invention it is to be understood that that embodiment is to be taken as illustrative only and not in a limiting sense. I do not wish to be limited to the specific structure shown and described but wish to include all equivalent variations thereof except as limited by the scope of the claims.

I claim:
1. A timer for controlling the operation of a washing machine comprising, a set of program cams constructed to operate program switches connected in circuit with the various operational instrumentalities of a washing machine, means including a motor and mechanical change speed gearing having at least three speed ratios for advancing said cams step by step at at least three different time intervals and means operated according to the stepped position of said cams for selecting the speed ratio of said advancing means and thus determining the time duration between the steps of said cams.

2. A timer according to claim 1 in which the means operated in accordance with the stepped position of said cams mechanically actuates said gearing to engage at least two of said speed ratios with said cams to determine the time duration of at least two of said steps.

3. A timer according to claim 1 in which said change speed gearing includes a high speed ratio driving said cams at a high speed such that the interval between two steps of said cams is negligible and thus to skip the operation which normally takes place at that point in the movement of said cams.

4. A timer according to claim 3 including manually actuatable means for rendering said high speed ratio effective.

5. A timer according to claim 3 in which said high speed ratio is moved into driving relation with said cams by an electric solenoid and a plurality of circuits for controlling said solenoid each including a switch actuated by said cams and a manually actuated switch.

6. A program timer comprising, a program cam movable to a plurality of stations, switch means actuatable by said program cam when moved to each of said stations for controlling the various timed operations of a washing machine, a timer motor, gearing driven by said motor including at least three time selector gears rotating at different speeds, means selectively driven by said time selector gears for advancing said program cam from station to station in a step by step manner, time selecting means at each of said stations for drivingly connecting one of said speed selector gears to said advancing means whereby the time duration of said program cam at said stations may be predetermined.

7. A program timer according to claim 6 in which one of said speed selector gears is driven at such a high speed that when drivingly connected to said advancing means the program cam is advanced to its next station substantially instantly.

8. A program timer according to claim 7 including electrically actuated means for drivingly connecting said high speed selector gear to said advancing means.

9. A program timer according to claim 8 including additional switches actuatable by said program cam when moved to each of said stations connected in circuit with said electrically actuated means.

10. A program timer according to claim 9 including condition responsive switches in series circuit with certain of said additional switches to advance said program cam to its next station in response to said condition responsive switches.

11. A program timer according to claim 10 in which some of said condition responsive switches are temperature responsive.

12. A program timer according to claim 10 in which one of said condition responsive switches is a level responsive switch having "full" and "empty" positions.

13. A program timer according to claim 9 including manually actuatable switches in series circuit with certain of said additional swiches to advance said program cam to its next station when said manually actuatable switches are closed.

14. A program timer according to claim 13 in which one of said manually actuatable switches is a starting switch which is momentarily closed to advance said program cam from its "off" station to its first operating station.

15. A program timer according to claim 13 in which one of said manually actuated switches is held closed to continuously advance said program cam from any station to its "off" station.

16. A program timer according to claim 6 in which said time selecting means has "neutral" positions at certain stations in which none of said time selector gears is in driving engagement with said advancing means.

References Cited in the file of this patent

UNITED STATES PATENTS

| | | |
|---|---|---|
| 2,272,237 | Brown et al. | Feb. 10, 1942 |
| 2,724,322 | Parr | Nov. 22, 1955 |

UNITED STATES PATENT OFFICE
CERTIFICATE OF CORRECTION

Patent No. 3,125,695 March 17, 1964

Walter W. R. Searle

It is hereby certified that error appears in the above numbered patent requiring correction and that the said Letters Patent should read as corrected below.

Column 1, line 18, for "wihich" read -- which --; column 5, line 33, for "74" read -- 75 --; column 8, line 58, for "21" read -- 22 --; column 9, line 9, for "C", second occurrence, read -- E --; line 12, after "21" insert -- is --; line 42, for "at" read -- to --.

Signed and sealed this 14th day of July 1964.

(SEAL)

Attest:

ESTON G. JOHNSON
Attesting Officer

EDWARD J. BRENNER
Commissioner of Patents